(No Model.)
W. SUTTON.
NUT LOCK.
No. 489,595.  Patented Jan. 10, 1893.
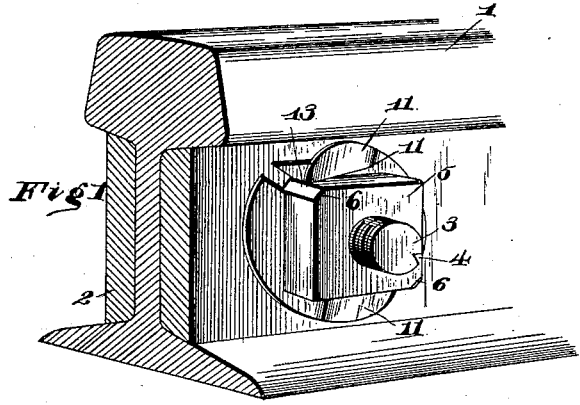
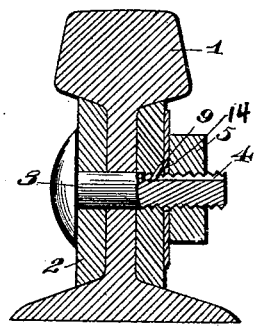
Fig. 4.
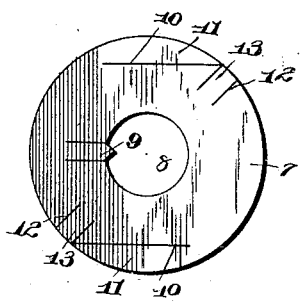
Fig. 2.
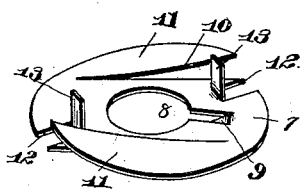
Fig. 3.
Witnesses
Chas A. Ford
J. H. Piggas
Inventor
W. Sutton.
By his Attorneys,
C. A. Snow & Co.

UNITED STATES PATENT OFFICE.

WILLIAM SUTTON, OF WILLISBURG, KENTUCKY, ASSIGNOR OF ONE-FOURTH TO ROBERT McILVOY, OF SAME PLACE.

NUT-LOCK.

SPECIFICATION forming part of Letters Patent No. 489,595, dated January 10, 1893.

Application filed April 30, 1892. Serial No. 431,289. (No model.)

*To all whom it may concern:*

Be it known that I, WILLIAM SUTTON, a citizen of the United States, residing at Willisburg, in the county of Washington and State of Kentucky, have invented a new and useful Nut-Lock, of which the following is a specification.

This invention relates to improvement in nut-locks; the objects in view being to provide a lock adapted to be applied to the nuts now in use, and to effectually lock the same against retrogression without any material change in the form or construction of the bolt or nut.

With these objects in view the invention consists in certain features of construction hereinafter specified and particularly pointed out in the claim.

Referring to the drawings:—Figure 1 is a perspective view of a portion of a rail joint, the nuts of the bolt of which are locked in accordance with my invention. Fig. 2 is a detail of the lock plate or washer before bending. Fig. 3 a perspective view of the same after bending. Fig. 4 is a transverse section of Fig. 1.

Like numerals indicate like parts in all the figures of the drawings.

1 designates a rail-section; 2 the fish bars or plates; 3 the bolt, the latter being provided at one side of its threaded portion with a groove 4, preferably angular in cross section.

5 designates the nut, and the same is preferably provided at one or more corners with a squared off corner 6.

7 designates in this instance a circular washer formed of iron or steel, and the same has at its center a bolt receiving opening 8, the edge of which is slit to form a downwardly bent tongue 9, terminating in an angular point conforming in shape to the groove 4 of the bolt. Transverse slits 10, are formed at opposite sides of the washer, and those portions of the metal of said washer outside of the slits constitute wings 11, which are such a distance apart as to enable them when bent up or out of a plane with the washer to embrace the same. Near each slit the outer periphery of the washer is provided with a pair of slits 12, and the intermediate portions of the washer constitute tongues 13, adapted to be upwardly bent at a right angle to the washer.

In operation after the bolt has been passed through the openings in the web of the rail and fish plates, the washer is applied upon the bolt so as to bear against the face of the plate. The nut is then run down on the bolt to bear against the washer. It will be seen that by the disposition the slots 10, the wings 11 will permit of the tightening of the nut upon the bolt and yet will prevent a retrogression of the nut. The opposite sides of the nut resting against and embraced by the edges of the wings 11, brings the corner notch 6 of the bolt into register or alignment with either of the tongues 13, which is now bent by a chisel or other device so that said tongues take into the recesses 6, and hence aid the wings 11 in preventing retrogression of the nut, and they at the same time prevent a forward movement of the nut, which is sometimes desirable and necessary so that the nut is locked at the desired point upon the bolt and cannot move forward or backward. If any of the wings 11 or the tongues 13 should become broken the device may still be operated as a nut lock. The tongue 9 not only engages with the groove 4 of the bolt but after washer is applied said tongue is punched down into an indentation 14 with which the object against which the washer rests is provided at the edge of the opening through which the bolt passes; in this instance the fish bar is thus provided.

From the foregoing description in connection with the accompanying drawings, it will be seen that I have provided an extremely cheap and simple nut lock adapted to be applied to nuts and bolts of ordinary construction with but very little change therein.

Having described my invention, what I claim is:—

The combination with the fish bar having the indentation at its bolt receiving-opening, and the bolt passing through the opening having a groove along its threaded portion in line with the indentation, of the washer having a bolt receiving-opening, the edge of which is provided with a downwardly and inwardly disposed tongue engaging the indentation of the fish plate and the groove of the bolt, said washer being further provided at
5 opposite sides with parallel upwardly bent wings for embracing the nut and near the beginning of each wing, with tongues upwardly bent at a right angle to the washer and the nut, and a nut one of the corners of which has a notch to engage the tongue, substantially 10 as specified.

In testimony that I claim the foregoing as my own I have hereto affixed my signature in the presence of two witnesses.

WILLIAM SUTTON.

Witnesses:
 C. C. McCHORD,
 R. McILVOY.